US012683958B2

(12) United States Patent
Agarwal et al.

(10) Patent No.: US 12,683,958 B2
(45) Date of Patent: Jul. 14, 2026

(54) BIOMETRIC MULTI-FACTOR AUTHENTICATION

(71) Applicant: Citrix Systems, Inc., Fort Lauderdale, FL (US)

(72) Inventors: Nimish Agarwal, Bangalore (IN); Ravi Kumar Bhojwani, Bangalore (IN); Sanket Garg, Bangalore (IN); Vivek Joshi, Bangalore (IN)

( * ) Notice: Subject to any disclaimer, the term of this patent is extended or adjusted under 35 U.S.C. 154(b) by 485 days.

(21) Appl. No.: 17/658,169

(22) Filed: Apr. 6, 2022

(65) Prior Publication Data

US 2023/0328057 A1     Oct. 12, 2023

(51) Int. Cl.
H04L 9/40          (2022.01)

(52) U.S. Cl.
CPC ........ H04L 63/0861 (2013.01); H04L 63/083 (2013.01); H04L 63/0853 (2013.01); *H04L 2463/082* (2013.01)

(58) Field of Classification Search
None
See application file for complete search history.

(56) References Cited

U.S. PATENT DOCUMENTS

| | | | | | |
|---|---|---|---|---|---|
| 7,054,819 | B1 * | 5/2006 | Loveland | | H04M 3/385 |
| | | | | | 715/756 |
| 8,886,544 | B2 * | 11/2014 | Kumar | | G10L 15/32 |
| | | | | | 704/273 |

| | | | | | |
|---|---|---|---|---|---|
| 8,925,058 | B1 * | 12/2014 | Dotan | | H04L 63/0861 |
| | | | | | 726/1 |
| 8,984,605 | B2 * | 3/2015 | Bauckman | | H04L 51/224 |
| | | | | | 726/7 |
| 9,262,609 | B2 * | 2/2016 | Bentley | | G06F 21/31 |
| 9,762,581 | B1 * | 9/2017 | Wang | | H04L 63/102 |
| 9,817,959 | B2 * | 11/2017 | Dadu | | H04W 12/33 |
| 10,044,712 | B2 * | 8/2018 | Gordon | | G02B 27/0172 |
| 10,075,846 | B1 * | 9/2018 | Acar | | H04L 63/0861 |
| 10,114,935 | B2 * | 10/2018 | Das | | H04L 63/0861 |
| 10,122,764 | B1 * | 11/2018 | Obaidi | | G06F 21/32 |
| 10,303,869 | B1 * | 5/2019 | Duke | | G06F 21/36 |
| 10,456,088 | B2 * | 10/2019 | Jain | | A61B 5/0006 |
| 10,762,183 | B1 * | 9/2020 | Charan | | G06F 21/40 |
| 10,909,225 | B2 * | 2/2021 | Kumar Agrawal | ... | H04L 9/3226 |
| 11,038,878 | B2 * | 6/2021 | Hoyos | | H04L 9/3231 |
| 11,113,370 | B2 * | 9/2021 | Toth | | G06N 20/00 |
| 11,133,929 | B1 * | 9/2021 | Shahidzadeh | ......... | H04L 9/0891 |
| 11,170,790 | B2 * | 11/2021 | Asher | | G10L 17/04 |
| 11,188,914 | B2 * | 11/2021 | Sethi | | G06F 21/43 |
| 11,831,780 | B2 * | 11/2023 | Badrinarayanan | .... | H04L 9/0866 |
| 2012/0262275 | A1 * | 10/2012 | Schultz | | H04W 12/06 |
| | | | | | 340/5.82 |

(Continued)

*Primary Examiner* — Backhean Tiv

(57) ABSTRACT

A system and method for providing multi-factor authentication using biometric data collected from a wearable. A disclosed method includes: receiving an authentication request for a user to access a resource via a client device; fetching a stored heartrate-voice (HRV) profile of the user; obtaining current heart data of the user from a wearable; obtaining a current voice sample of the user from the wearable or the client device; comparing the current heart data and current voice sample with the HRV profile; and authenticating the user in response to a match between the current heart data and current voice sample with the HRV profile.

19 Claims, 9 Drawing Sheets

10

(56) References Cited

U.S. PATENT DOCUMENTS

| | | | |
|---|---|---|---|
| 2013/0097682 A1* | 4/2013 | Zeljkovic | H04L 9/3234 |
| | | | 726/7 |
| 2014/0085050 A1* | 3/2014 | Luna | H04W 12/33 |
| | | | 340/5.82 |
| 2014/0089673 A1* | 3/2014 | Luna | H04L 63/0861 |
| | | | 713/186 |
| 2014/0313007 A1* | 10/2014 | Harding | G07C 9/37 |
| | | | 340/5.52 |
| 2016/0034707 A1* | 2/2016 | Sahu | H04L 9/0866 |
| | | | 713/168 |
| 2016/0087952 A1* | 3/2016 | Tartz | H04W 12/06 |
| | | | 455/411 |
| 2016/0283703 A1* | 9/2016 | Allyn | H04L 63/0861 |
| 2016/0308859 A1* | 10/2016 | Barry | G07C 9/22 |
| 2017/0118206 A1* | 4/2017 | Liu | G06F 21/32 |
| 2018/0309792 A1* | 10/2018 | Obaidi | G06F 21/32 |
| 2019/0012443 A1* | 1/2019 | Kwok-Suzuki | G06F 21/316 |
| 2019/0182176 A1* | 6/2019 | Niewczas | G10L 17/24 |
| 2019/0268329 A1* | 8/2019 | Toth | G06F 21/6209 |
| 2019/0268331 A1* | 8/2019 | Toth | H04L 63/102 |
| 2020/0027091 A1* | 1/2020 | Hassani | H04L 63/0807 |
| 2020/0028844 A1* | 1/2020 | Aime | H04L 63/107 |
| 2020/0089851 A1* | 3/2020 | Kumar Agrawal | G06V 20/52 |
| 2020/0151601 A1* | 5/2020 | Niewczas | G06N 7/01 |
| 2020/0160346 A1* | 5/2020 | Sethi | G06Q 20/40145 |
| 2020/0285873 A1* | 9/2020 | Condon | G06V 40/10 |
| 2020/0342086 A1* | 10/2020 | Oung | H04W 12/065 |
| 2021/0093515 A1* | 4/2021 | Valentine | G16H 40/63 |
| 2022/0269870 A1* | 8/2022 | Goel | G06F 40/53 |
| 2023/0328057 A1* | 10/2023 | Agarwal | H04L 63/083 |
| | | | 726/7 |

* cited by examiner

BIOMETRIC MULTI-FACTOR AUTHENTICATION

BACKGROUND OF THE DISCLOSURE

Multi-factor authentication (MFA) has become a common authentication method for accessing resources such as devices, websites, applications, online accounts, networks, etc. MFA requires the user to provide two or more verification factors to gain access to a resource. Typically, the first verification factor includes a username and password. Secondary verification factors may be implemented with, e.g., one-time passwords (OTP) that are forwarded to a user device, biometrics collected with specialized fingerprint readers, personal hardware devices that plug into a port on a laptop, etc.

BRIEF DESCRIPTION OF THE DISCLOSURE

Aspects of this disclosure include a system and method for implementing multi-factor authentication (MFA) using biometrics obtained from commonly used wearables.

A first aspect of the disclosure provides a system that includes a memory and a processor coupled to the memory and configured to perform multi-factor authentication (MFA) according to a process. The process includes receiving an authentication request for a user to access a resource via a client device and fetching a stored heartrate-voice (HRV) profile of the user. Next, current heart data of the user from a wearable and a current voice sample of the user is obtained from the wearable or the client device. The current heart data and current voice sample are then compared with the HRV profile and the user is authenticated in response to a match between the current heart data and current voice sample with the HRV profile.

A second aspect of the disclosure provides a method that perform multi-factor authentication (MFA) according to a process. The process includes receiving an authentication request for a user to access a resource via a client device and fetching a stored heartrate-voice (HRV) profile of the user. Next, current heart data of the user from a wearable and a current voice sample of the user is obtained from the wearable or the client device. The current heart data and current voice sample are then compared with the HRV profile, and the user is authenticated in response to a match between the current heart data and current voice sample with the HRV profile.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of this disclosure provide technical solutions for implementing multi-factor authentication (MFA) using wearables, such as smart watches, fitness bands, smart clothing, chest wraps, etc., that can collect heart data, such as heartbeat rates, electrocardiograms, etc. In certain embodiments, heart data is modeled with voice data to provide a combined verification factor for an MFA service.

Figure 1:
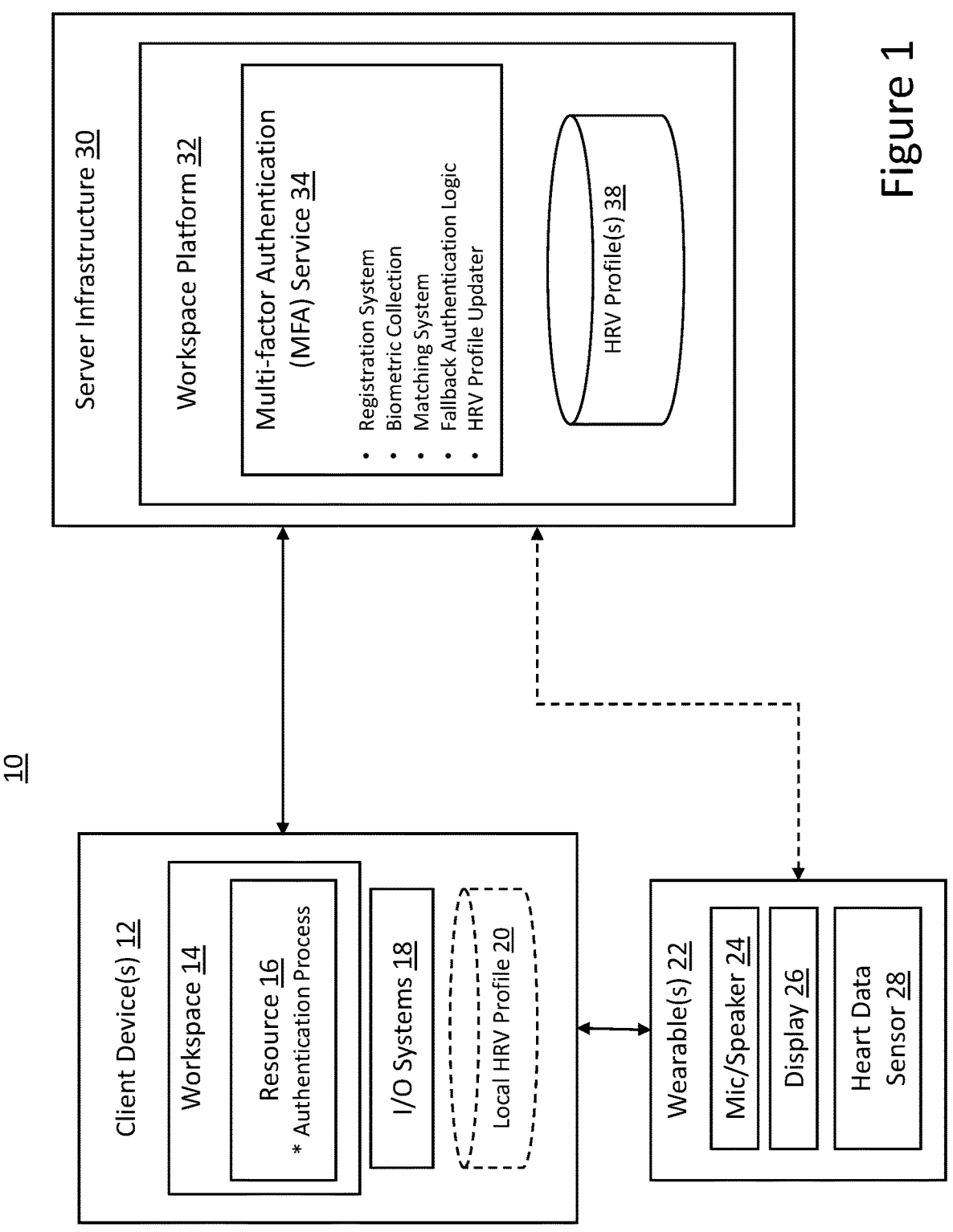
FIG. 1 depicts an illustrative wearable platform having an MFA service, in accordance with an illustrative embodiment.

FIG. 1 depicts an illustrative MFA platform 10 that includes client device(s) 12 (e.g., a smartphone, a laptop, a desktop, etc.), a wearable(s) 22, and a server infrastructure 30 that implements an MFA service 34. In this embodiment, the server infrastructure 30 includes a workspace platform 32 for implementing the MFA service 34 and providing virtual workspaces 14 on client device(s) 12. However, it is understood that the MFA service 34 can be implemented in any client-server or cloud infrastructure, i.e., with or without a workspace platform 32. In this example, when a user of client device 12 requires access to a resource 16, e.g., an application, website, account, device, etc., the user initiates an authentication process (e.g., by attempting to launch an application), which triggers the MFA service 34. In certain embodiments, this includes entering a username/password as a first verification factor, followed by a biometric authentication process as a second verification factor.

In various implementations, the biometric authentication process includes collecting heart data via a heart data sensor 28 in the wearable 22 and voice data either from the wearable 22 or the client device 12. During the authentication process, the MFA service 34 combines the collected data into a biometric vector which is compared to a heart-rate-voice (HRV) profile 38 of the user stored in the server infrastructure 30. If the collected biometric vector "matches" the HRV profile 38 of the user, the user is authenticated. The HRV profile 38 is generated during a registration process, described in further detail herein. In alternative embodiments, rather than storing the HRV profile 38 in the server infrastructure 30, a local HRV profile 20 can be stored on the client device 12 and some or all of the MFA processing can be done at the client device 12. Further, in various implementations, the HRV profile 38, 20 is encrypted.

Heart data sensor 28 may include any type of device capable of collecting heart data. For example, sensor 28 may comprise a pulse sensor that detects pulse wave signals indicating a change in volume of a blood vessel that occurs when the heart pumps. The sensor 28 may be configured to collect, e.g., 10 seconds worth of heartbeat data to determine a heart rate. Note that while the above example involves the use of a heart rate for the heart data component of the analysis, any type of heart data could be used. For example, an electrocardiogram (ECG) waveform could be collected during the registration process with the wearable 22 and be stored within the HRV profile 38 as heart data. Then, during the authentication process, a current ECG waveform is collected from the user via the wearable 22 and compared with the one stored in the HRV profile 38 for a match. In other embodiments, heart rhythm data can be utilized.

In certain approaches, voice data may be collected from a microphone/speaker system 24 implemented in the wearable 22. For example, the speaker can output a word (or words) randomly selected from a dictionary by the MFA service 34 and prompt the user to repeat (i.e., echo) the word back. The associated microphone captures the audio signal and sends the signal back to the MFA service 34. The collected audio signal and heart data provide a biometric vector that can then be compared to HRV profile 38 of the user.

As noted, the HRV profile 38 may for example include a target heart rate and voice model collected during a registration process from the wearable 22. In certain embodiments, the voice model may include a machine learning model such as a neural network trained with voice samples inputted by the user during the registration process. Determining whether a biometric match exists during the authentication process includes (1) comparing the heart rate collected during the authentication process with the target heart rate and (2) evaluating the collected voice sample with the voice model. The heart rate comparison may include a simple mathematical evaluation such as a percent difference between the two, e.g., the collected heart rate is within N % of the target heart rate. The voice sample analysis can use any known speaker recognition technique to verify the user. For example, the collected voice sample can be compared to the voice model of the user using a text-independent system in which the collected voice sample differs from voice samples collected during the registration process. Such a system may utilize at least one of acoustics and speech analysis using, e.g., frequency estimation, hidden Markov models, Gaussian mixture models, pattern matching algorithms, neural networks, matrix representation, vector quantization and decision trees. In some instances, the voice sample analysis may return a match probability, e.g., M %. In some embodiments, the results of the heart rate analysis and the voice sample analysis can be combined and measured against a threshold to determine if a match exists. For example, if (N %+M %)/2>95%, then a match exists, and the user is authenticated. In other cases, both results may be required to exceed separate thresholds.

Depending on the type of wearable 22 being used, a microphone/speaker system 24 may or may not be included. In the case where a microphone/speaker system 24 is not included, the wearable 22 may include a display 26, which can be used to display a prompt for the user to utter a word. In this case, input/output (I/O) systems 18 of the client device 12 (e.g., a microphone) can be used to capture the voice sample if the wearable does not have a microphone. If there is no display on the wearable 22, then the I/O systems 18 of the client device (e.g., a microphone, display and speakers) can be used to prompt the user and collect a voice sample.

Figure 2:
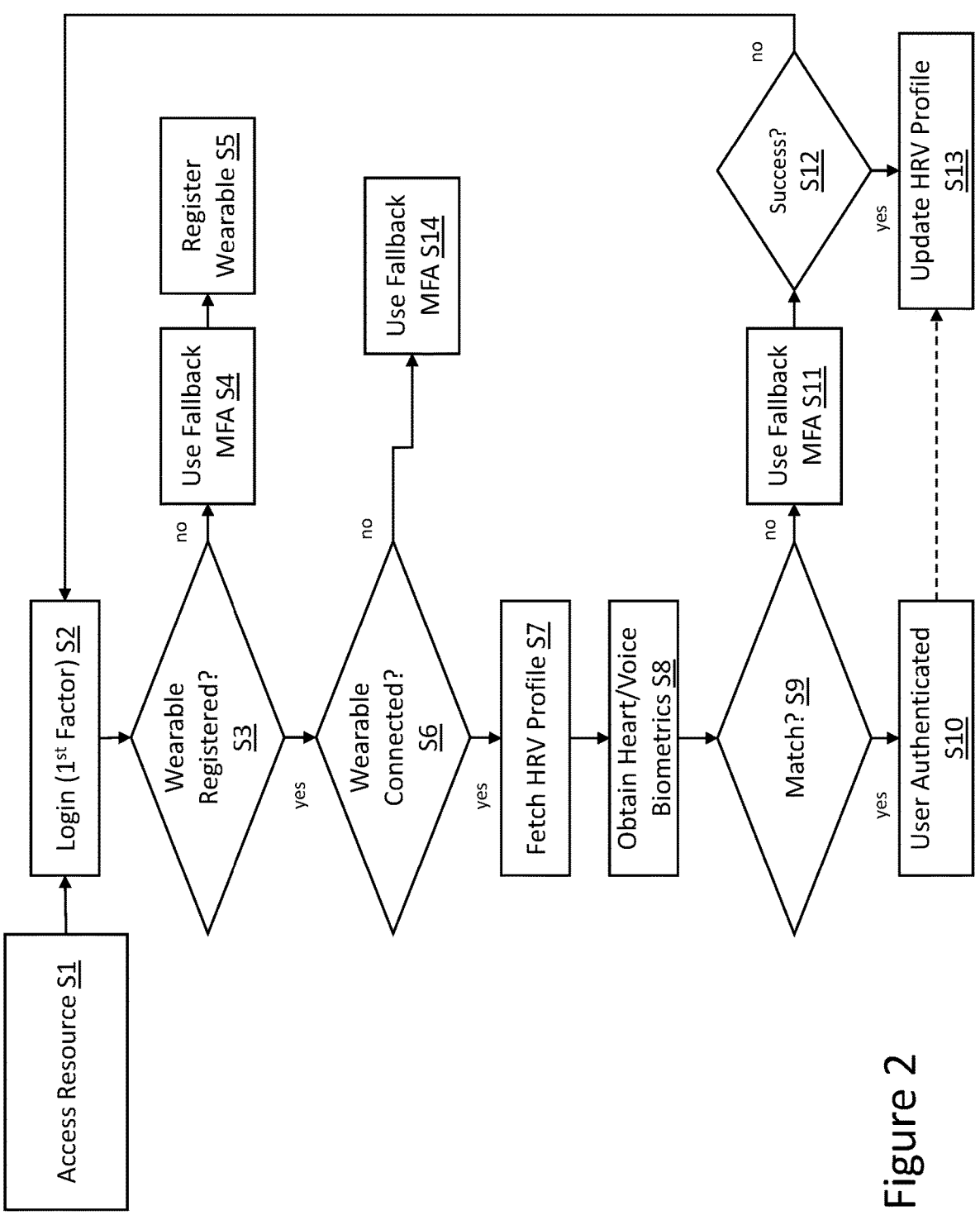
FIG. 2 depict an illustrative flow diagram for implementing MFA, in accordance with an illustrative embodiment.

FIG. 2 depicts an illustrative MFA process in which a user attempts to access a resource via a client device at S1, and a username/password login process provides a first authentication factor at S2. Next at S3, a determination is made if there are any registered wearables 22. If no, then at S4 a fallback MFA agent is used to collect a second authentication factor, e.g., a one-time password is generated. Once the user is authenticated, the user can be asked if they want to register a wearable 22 for future MFA requests.

If yes at S3, the process checks to see if the registered wearable 22 is connected to the client device 12 at S6. If no, then the fallback MFA agent is used to collect a second authentication factor at S14. If yes at S6, the HRV profile 38 for the user is fetched at S7 (and decrypted if encrypted) and current heart and voice biometrics are collected at S8, e.g., a voice sample and a heartbeat are collected from the wearable 22. At S9, a determination is made whether the collected biometrics match the HRV profile 38. If yes at S9, the user is authenticated at S10 and the HRV profile 38 can be updated with the collected biometrics, e.g., the voice model can be further trained, the target heart rate can be adjusted, etc. If no at S9, the fallback MFA agent is used at S11. If the fallback MFA agent is successful at S12, the HRV profile 38 can be similarly updated with the collected biometrics at S13, e.g., to further train the voice model and/or adjust the target heart rate. If the fallback MFA agent is not successful at S12, the process can repeat to try again.

Figure 3:
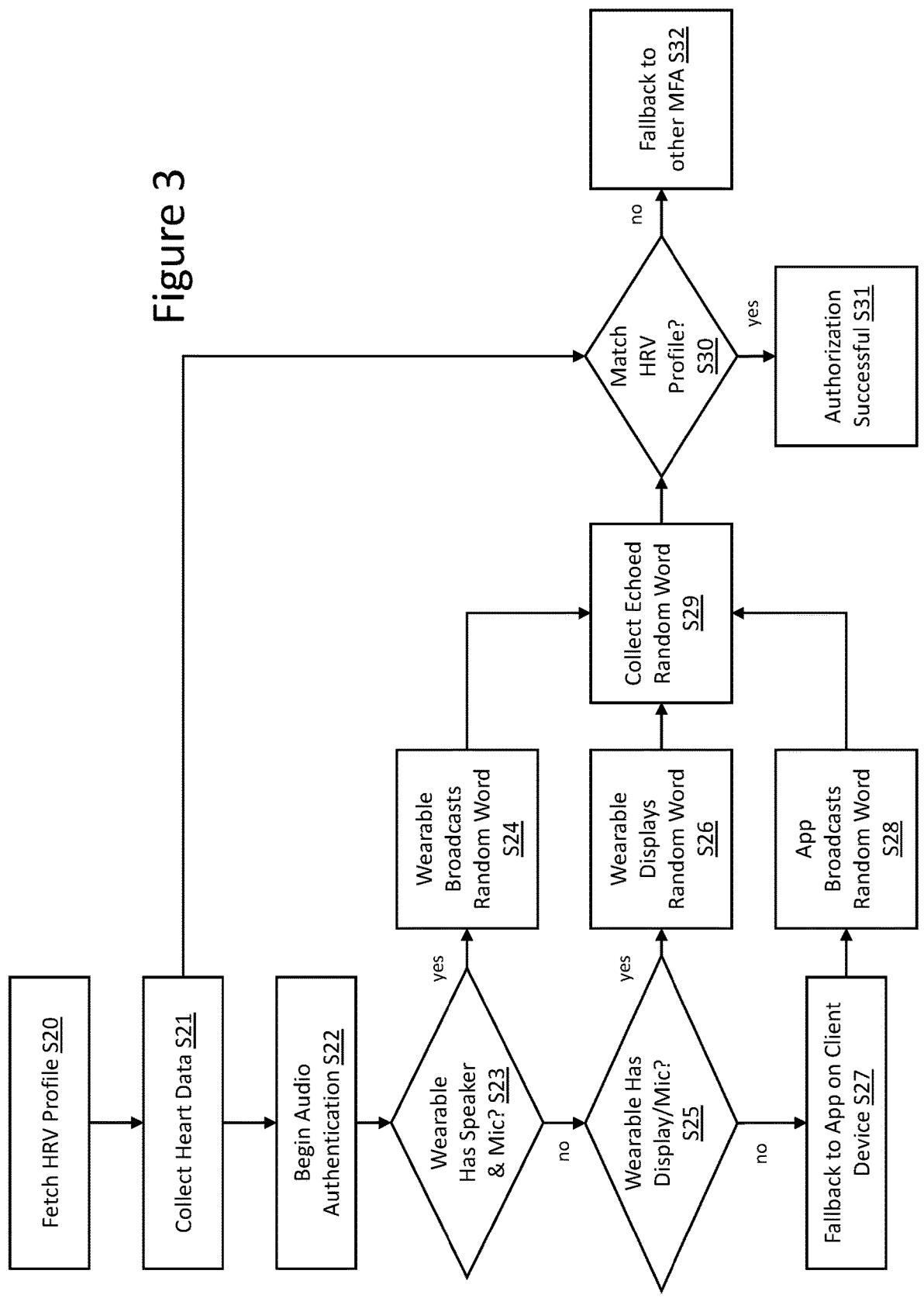
FIG. 3 depicts an illustrative flow diagram for collecting biometric data during an MFA process, in accordance with an illustrative embodiment.

FIG. 3 depicts an illustrative process for collecting and processing biometric data. At S20 the HRV profile 38 for the user is fetched and at S21 heart data is collected via the wearable 22 and provided to S30 for authentication, e.g., by comparing the heart data to a target heartbeat in the HRV profile 38. Next audio authentication begins at S22 which includes first checking to see if the wearable 22 has a speaker and microphone at S23. If yes, the wearable 22 broadcasts a random word at S24 to be uttered by the user and the microphone collects the user echoed word at S29. If no at S23, a determination is made whether the wearable 22 has a display and microphone at S25. If yes at S25, the wearable 22 displays a random word and prompts the user to echo the word at S26, which is then collected at S29 via the microphone. If no at S25, then an application on the client device 12 displays or outputs the random word at S27, S28 and the user echoed random word is collected by the application at S29.

Once the heartbeat data and voice sample are collected, a determination is made at S30 whether the collected biometric data matches the HRV profile 38. If yes, the authorization is successful at S31 and if no, a fallback MFA agent is used at S32.

Figure 4:
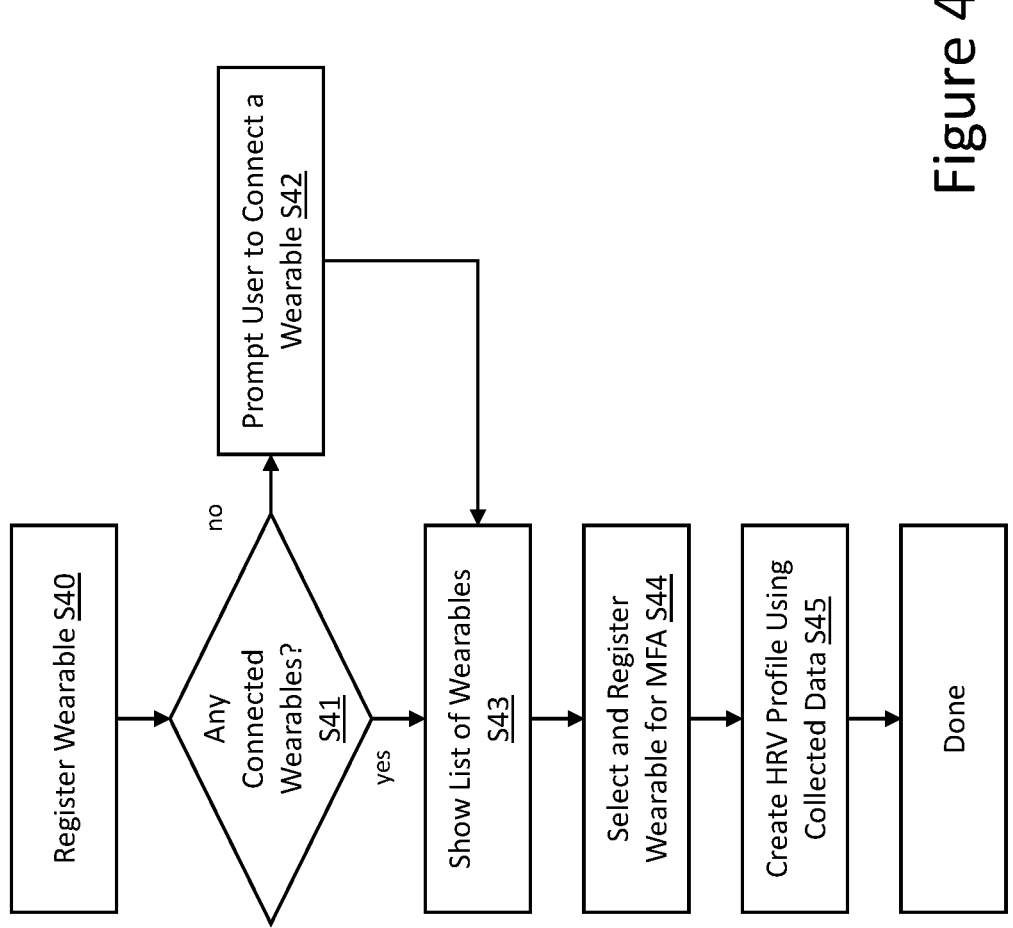
FIG. 4 depicts an illustrative flow diagram for registering a wearable within an MFA process, in accordance with an illustrative embodiment.

FIG. 4 depicts an illustrative process for registering a wearable 22 at a client device 12 that begins at S40. First, at S41 a determination is made whether any wearables 22 are connected to the user's client device 12. If no, the user is prompted to connect a wearable 22 (e.g., using Bluetooth or other wireless technologies). If yes at S41, a list of connected wearables 22 is shown to the user at S43 and the user selects and registers a wearable for MFA at S44. During this process, the user's voice samples will be taken to create a voice model and the user's heart data will be read from the wearable, e.g., to provide a target heart rate, baseline ECG, etc. The collected data is then stored in a created HRV profile at S45 and the process completes.

In accordance with the described embodiments, authentication is provided via a user's HRV profile, which is natural and unique to an individual and offers nonrepudiation. Furthermore, specialized hardware is not needed for MFA, as the user's existing wearable hardware, e.g., smart watch, fitness band, chest wrap etc., act as an MFA agent.

Although generally described herein for accessing resources, the provided MFA approaches could likewise be used in field where authentication is required, e.g., inactivity timeout scenarios, renewing open authentication (OAuth) tokens, etc.

Figure 5:
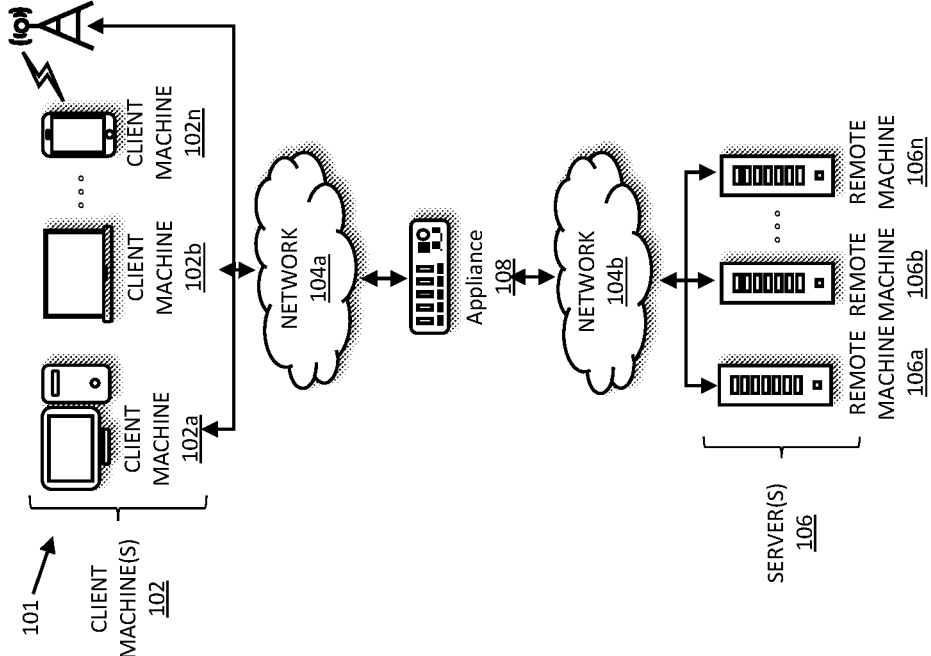
FIG. 5 depicts a network infrastructure, in accordance with an illustrative embodiment.

It is understood that the MFA service 34 can be implemented in any manner, e.g., as a stand-alone system, a distributed system, within a network environment, etc. Referring to FIG. 5, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 6:
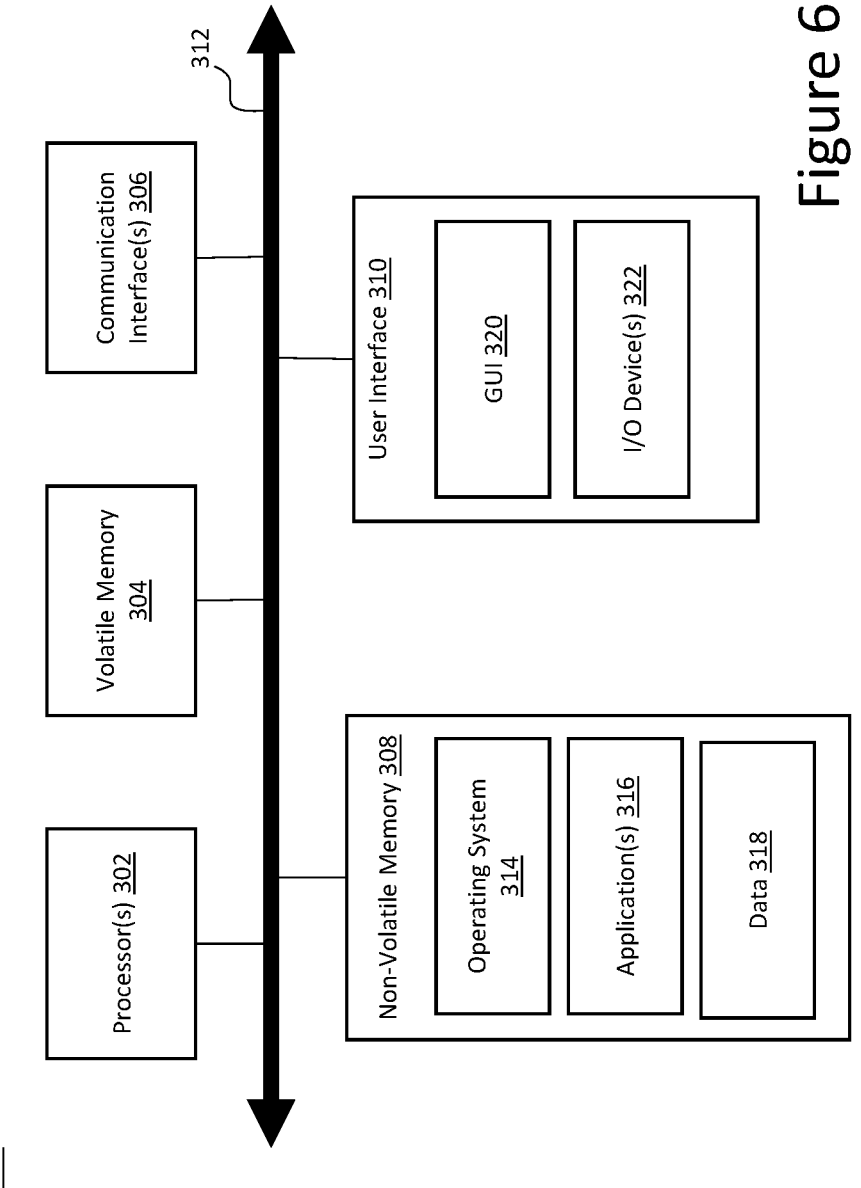
FIG. 6 depicts a computing system, in accordance with an illustrative embodiment.

Elements of the described solution may be embodied in a computing system, such as that shown in FIG. 6 in which a computing device 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 6 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 7A:
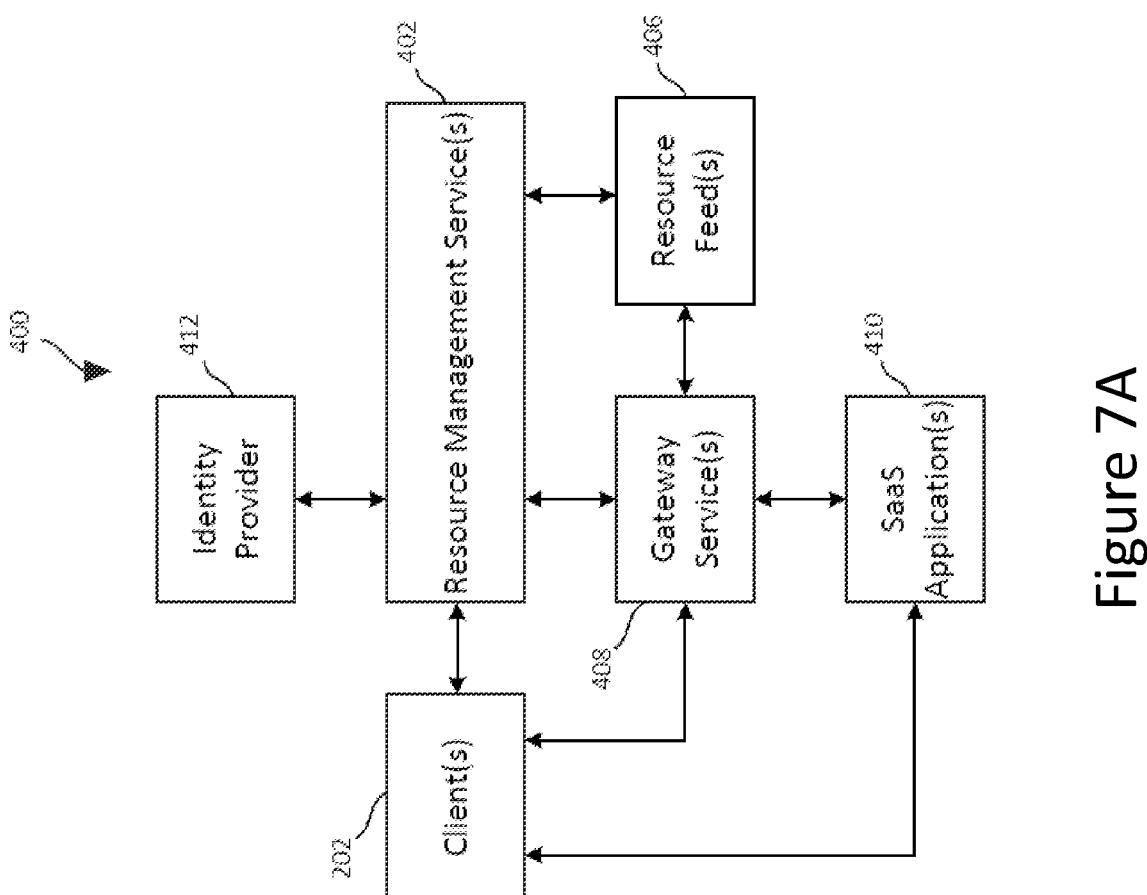
FIG. 7A is a block diagram of an example system in which resource management services may manage and streamline access by clients to resource feeds (via one or more gateway services) and/or software-as-a-service (SaaS) applications.

FIG. 7A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 7B:
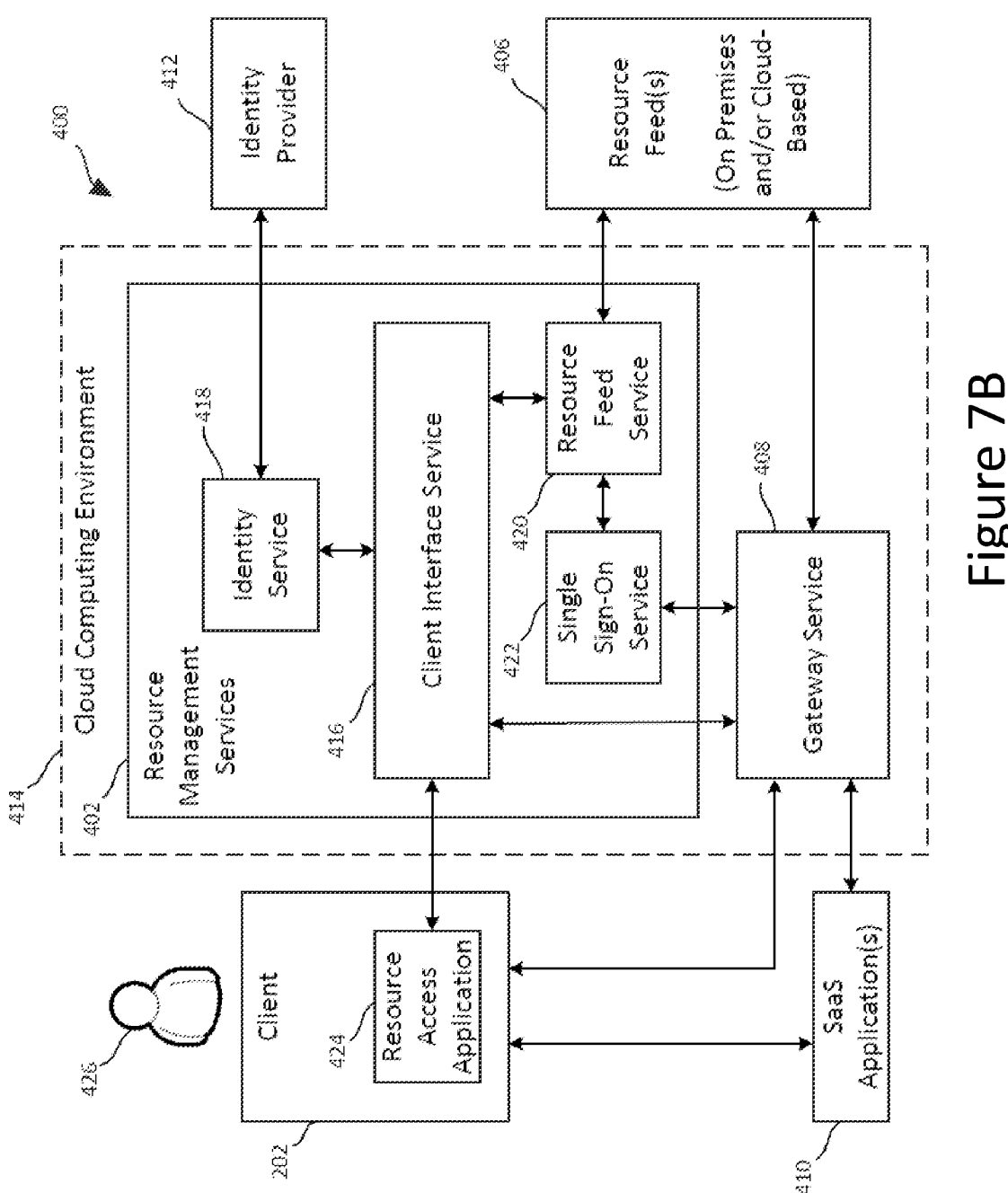
FIG. 7B is a block diagram showing an example implementation of the system shown in FIG. 7A in which various resource management services as well as a gateway service are located within a cloud computing environment.

FIG. 7B is a block diagram showing an example implementation of the system 400 shown in FIG. 7A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 7B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 7B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 7B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 7B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 7C:
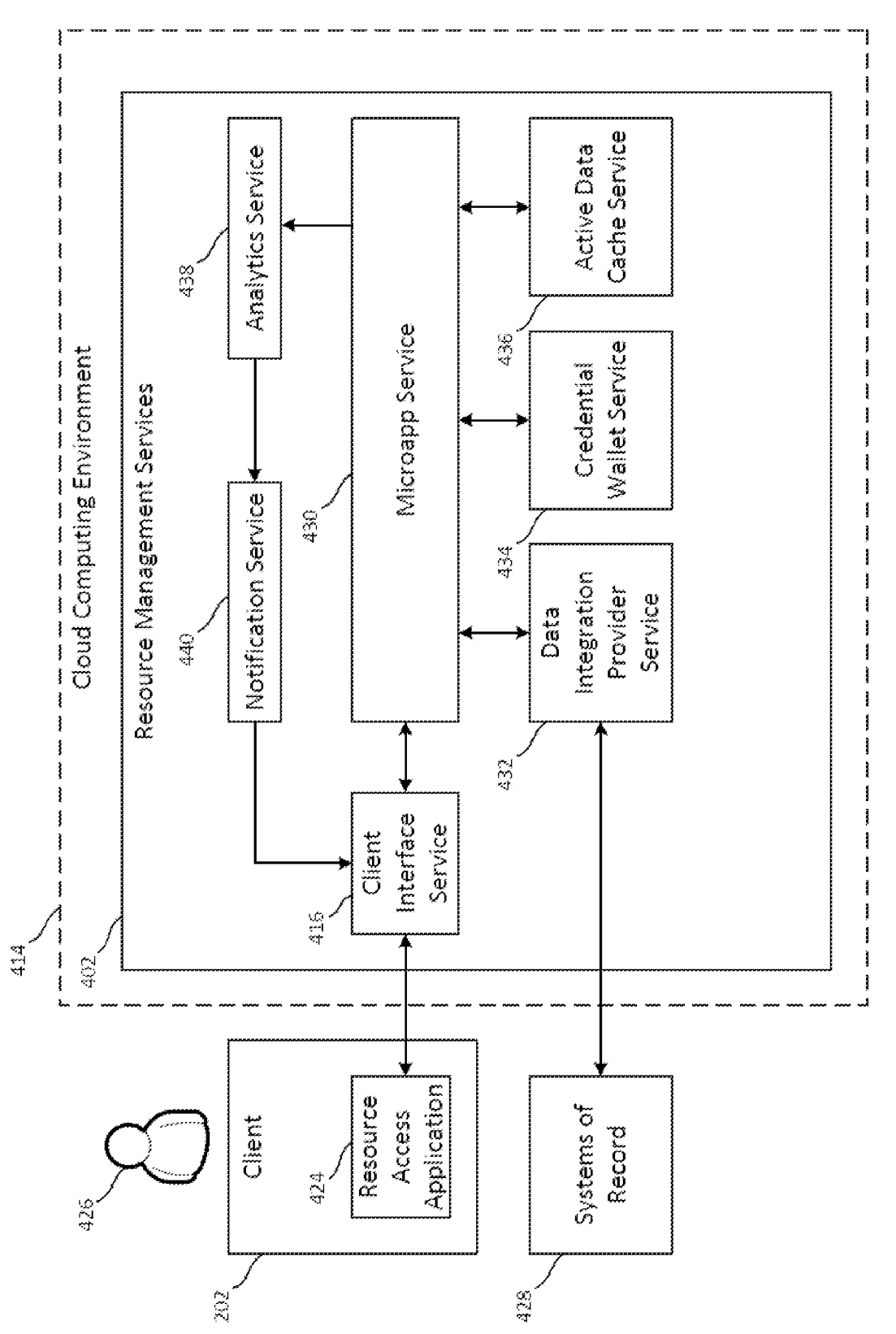
FIG. 7C is a block diagram similar to that shown in FIG. 7B in which the available resources are represented by a single box labeled "systems of record," and further in which several different services are included among the resource management services.

FIG. 7C is a block diagram similar to that shown in FIG. 7B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 7C may enable the provision of a streamlined resource activity feed and/or notification process for a client 202. In the example shown, in addition to the client interface service 416 discussed above, the illustrated services include a microapp service (or simply "microservice") 430, a data integration provider service 432, a credential wallet service 434, an active data cache service 436, an analytics service 438, and a notification service 440. In various embodiments, the services shown in FIG. 7C may be employed either in addition to or instead of the different services shown in FIG. 7B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 7C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 7C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?"

The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information they're looking for.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The invention claimed is:

1. A system, comprising:

a memory; and a processor coupled to the memory and configured to perform multi-factor authentication (MFA) according to a process that includes:

receiving an authentication request for a user to access a resource via a client device;

fetching a stored heartrate-voice (HRV) profile of the user;

obtaining current heart data of the user from a wearable device;

obtaining a current voice sample of the user from the wearable device or from the client device;

generating a biometric vector based on the current heart data and the current voice sample;

comparing the biometric vector with the stored HRV profile; and authenticating the user in response to a threshold being satisfied between the biometric vector with the stored HR V profile;

wherein the threshold is determined by (N %+M %)/2>95%, where the current heart rate is within N % and a voice match probability is M %.

2. The system of claim 1, wherein the authentication request includes first collecting a username and password from the user as a first authentication factor.

3. The system of claim 1, wherein the HRV profile is created during an initial registration process in which target heart data is obtained from the wearable and voice samples are obtained via the wearable or other device.

4. The system of claim 1, wherein the heart data includes at least one of a heart rate, an electrocardiogram signal, or a heart rhythm.

5. The system of claim 1, wherein the process further includes using a fallback MFA agent in response to the obtained heart data and voice sample not matching the HRV profile.

6. The system of claim 5, wherein in response to the fallback MFA agent successfully authenticating the use, updating the HRV profile with the current heart data and voice sample.

7. The system of claim 1, wherein obtaining a voice sample of the user includes randomly generating and outputting a word from a dictionary for the user to utter as the voice sample.

8. The system of claim 7, wherein the word is output to the user:

as an audio from the wearable if the wearable has audio output capability; or as a visual display from the wearable if the wearable has no audio output capability and the wearable has visual display capability.

9. The system of claim 1, wherein the HRV profile comprises a machine learning model that is trained with the current heart data and voice sample obtained during each successful authentication.

10. A method of performing multi-factor authentication (MFA), comprising:

receiving an authentication request for a user to access a resource via a client device;

fetching a stored heartrate-voice (HRV) profile of the user;

obtaining current heart data of the user from a wearable device;

obtaining a current voice sample of the user from the wearable device or from the client device;

generating a biometric vector based on the current heart data and the current voice sample;

comparing the biometric vector with the stored HRV profile; and authenticating the user in response to a threshold being satisfied between the biometric vector with the stored HRV profile;

wherein the threshold is determined by (N %+M %)/2>95%, where the current heart rate is within N % and a voice match probability is M %.

11. The method of claim 10, wherein the authentication request includes first collecting a username and password from the user as a first authentication factor.

12. The method of claim 10, wherein the HRV profile is created during an initial registration process in which target heart data is obtained from the wearable and voice samples are obtained via the wearable or other device.

13. The method of claim 10, wherein the heart data includes at least one of a heart rate, an electrocardiogram signal, or a heart rhythm.

14. The method of claim 10, wherein the process further includes using a fallback MFA agent in response to the obtained heart data and voice sample not matching the HRV profile.

15. The method of claim 14, wherein in response to the fallback MFA agent successfully authenticating the use, updating the HRV profile with the current heart data and voice sample.

16. The method of claim 10, wherein obtaining a voice sample of the user includes randomly generating and outputting a word from a dictionary for the user to utter as the voice sample.

17. The method of claim 16, wherein the word is output to the user:

as an audio from the wearable if the wearable has audio output capability; or as a visual display from the wearable if the wearable has no audio output capability and the wearable has visual display capability.

18. The method of claim 10, wherein the HRV profile comprises a machine learning model that is trained with the current heart data and voice sample obtained during each successful authentication.

19. A method of performing multi-factor authentication (MFA) comprising:

receiving an authentication request for a user to access a resource via a client device, wherein the server executes the request on a virtual machine;

fetching a stored heartrate-voice (HRV) profile of the user;

obtaining current heart data of the user from a wearable device;

obtaining a current voice sample of the user from the wearable device or from the client device;

generating a biometric vector based on the current heart data and the current voice sample;

comparing the biometric vector with the stored HRV profile; and authenticating access to the virtual resource by the user in response to a threshold being satisfied between the biometric vector with the stored HRV profile;

wherein the threshold to be met is determined by (N %+M %)/2>95%, where the current heart rate is within N % and a voice match probability is M %.

* * * * *